Figure 1:
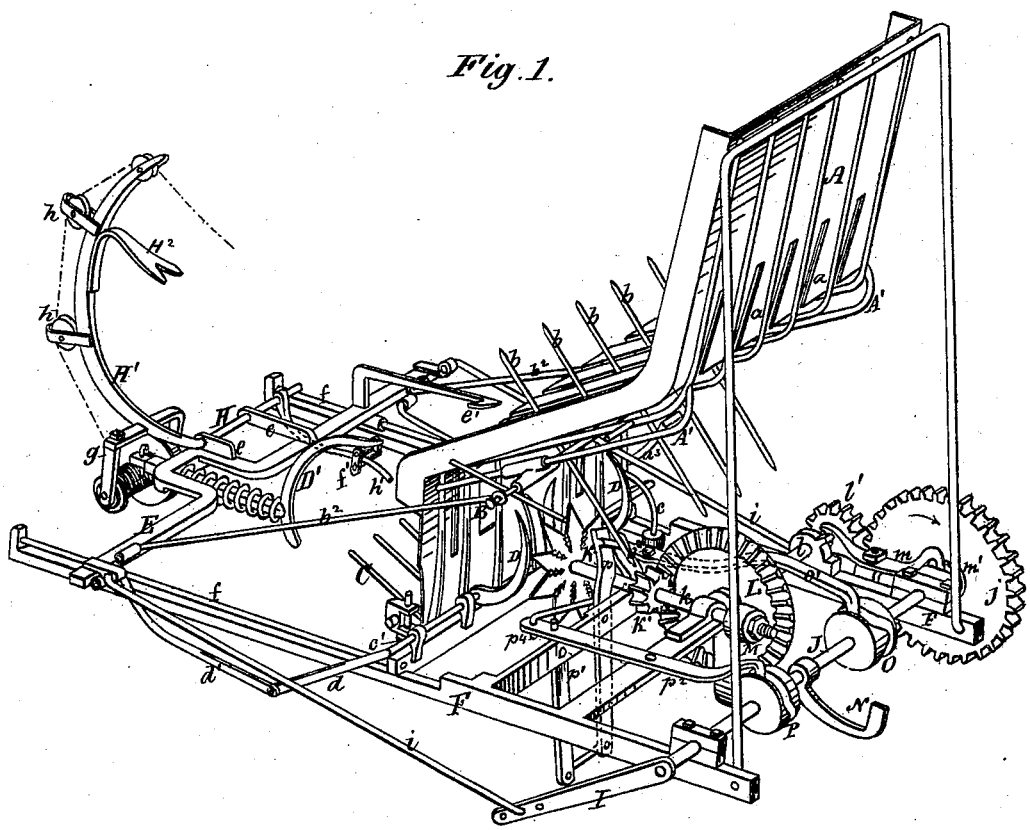

2 Sheets—Sheet 1.

J. E. BUXTON.
GRAIN-BINDER.

No. 178,993. Patented June 20, 1876.

Attest:
P. McNickle
W. E. Chaffee

Inventor:
John E. Buxton.
per, L. Deane
Atty

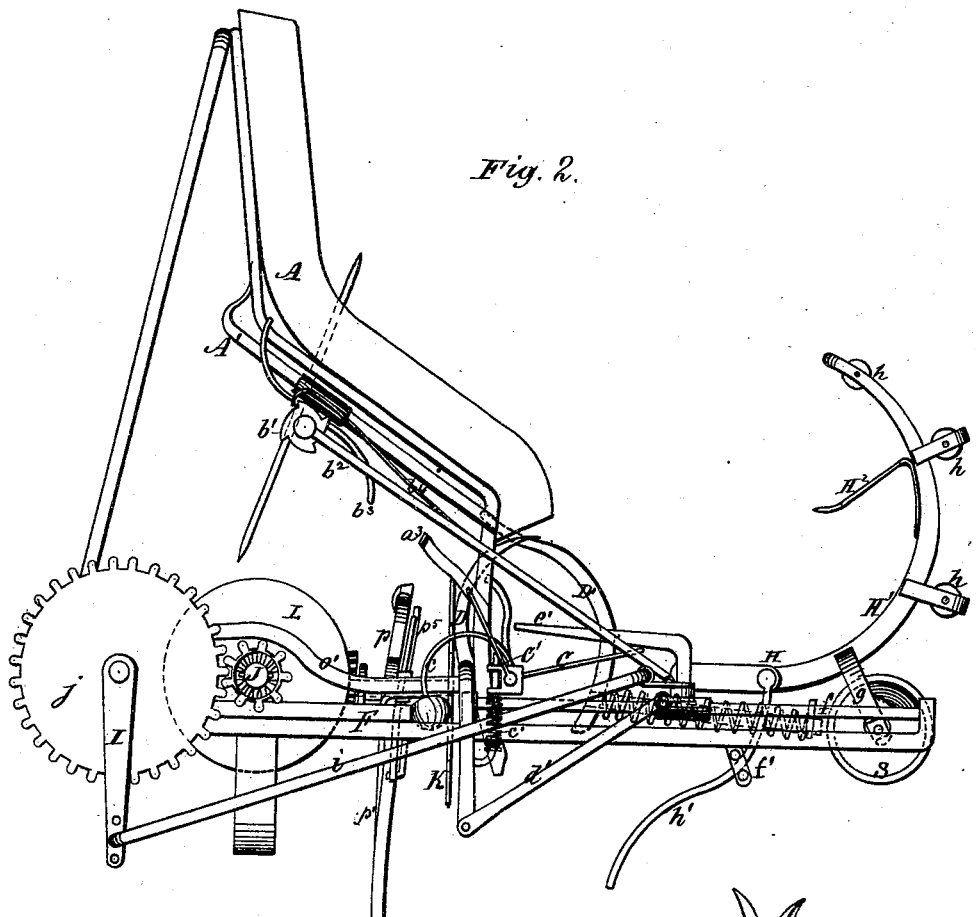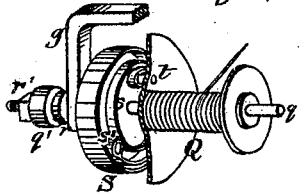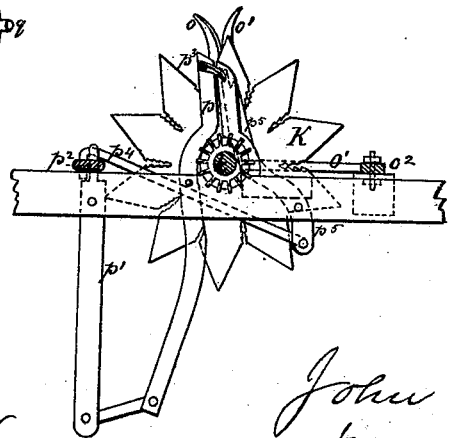

UNITED STATES PATENT OFFICE.

JOHN E. BUXTON, OF OWATONNA, MINNESOTA.

IMPROVEMENT IN GRAIN-BINDERS.

Specification forming part of Letters Patent No. 178,993, dated June 20, 1876; application filed April 24, 1876.

*To all whom it may concern:*

Be it known that I, JOHN E. BUXTON, of Owatonna, in the county of Steele and State of Minnesota, have invented certain new and useful Improvements in Grain-Binders, of which the following is a specification:

Figure 1 represents, in perspective, my grain-binding machine. Fig. 2 represents a side elevation of the same. Fig. 3 represents a transverse section, showing the pinchers and the twisting-wheel. Fig. 4 represents, in perspective, the griping device that holds the binding-wire while being twisted. Fig. 5 represents, in perspective, the reel partly broken away to exhibit the take-up spring attached to it.

My invention relates to that class of grain-binding machines in which wire is used to bind the grain, and is to be employed in connection with harvesters in which the cut grain is received on an endless apron, and elevated by means of canvas or belts, or any other suitable device, above the driving-wheel of the harvester, and comes down on the opposite side in a continuous stream.

My invention relates, also, to certain combinations of a reciprocating and revolving cut-off, to arrest at times the grain descending continuously, and a slatted platform to receive it and hold it in proper position to be bound. It relates, also, to a wire-twisting mechanism, in connection with nippers and a griping device, by means of which the grain-bundles are securely bound after having been held and compressed by my improved mechanism.

In the drawings, A represents an inclined slide, upon which the grain is received in a continuous stream, after having been elevated over the driving-wheel of that class of harvesters in which elevated aprons or belts are used. In this slide A a series of slots, $a$, are cut, through which the teeth $b$ of a rake can project upward at stated times and arrest the grain in its descent. The teeth $b$ are attached to a bar, B, having an intermittent rotating and also a sliding motion back and forth upon guides A', attached to the frame of the slide A. When the teeth $b$ of the cut-off are out of the way of the falling grain, the latter will descend upon a slatted platform, C, that is held in position to receive the grain by means of a counterpoised weight, $c$. The platform C is supported by springs $c'$ at each end, to relieve the bundle of grain from too great a pressure when the bent arms D come down upon the bundle to compress it, in conjunction with the spring-compressor D', that is carried back and forth by a reciprocating frame, E, sliding upon guide-rods $f$, attached to the main frame F of this machine. This reciprocating frame E carries, in suitable bearings $e$, a rock-shaft, H, to one end of which the crescent wire-carrier $H^1$ is attached. Upon this carrier is located a frame, $g$, that carries the reel and the pulleys $h$, used as guides for the binding-wire while it is brought from the reel to the nippers.

The reciprocating frame E is moved back and forth by means of two connecting-rods, $i$, united to two crank-arms, I, attached to the main driving-shaft J. The rock-shaft H and with it the crescent wire-carrier $H^1$ are made to perform a semi-revolution by the action of the curved rod $h'$, attached to one end of the rock-shaft H, passing through a loop, $f'$, pivoted to the main frame, the rod $h'$ being curved in such a manner as to give to the wire carrier the desired motion to bring the wire around the bundle of grain to the nippers and to the wheel that is to twist it, while the carrier is brought to the bundle of grain by the crank-arms I and connecting-rods $i$. When the wire band has been placed around the grain, and the ends are twisted, the sheaf is discharged by depressing or partly rotating the slatted platform C, by means of a hook, $e'$, upon the reciprocating frame E, engaging with a rod, C', attached to one end of the pivoted shaft of the slatted platform C, while the frame E accomplishes its backward movement, and then the rod C' is released, and the counterpoise-weight $c$ returns the platform C to its normal position.

The ends of the wire that form the bands are twisted together by means of a star-shaped wheel, K, mounted upon a shaft, $k$. This shaft carries a pinion, $k'$, that meshes with a bevel-gear wheel, L, attached to a shaft, $l$, parallel to the main driving-shaft J. The shaft $l$ is rotated periodically, so that the twisting-wheel K can operate upon the ends of the binding-wire at the proper moment by means of a pinion, $l'$, that can be moved in and out of gear with the gear-wheel $j$, on the shaft J, by a clutch-lever, $m$, operated by a cam, $m'$. The star-shaped twisting-wheel K is represented rather large in proportion to the other devices in the drawing, so as to show the serrations formed upon it to retain the ends of the wire with certainty while they are twisted together in a secure manner. During that operation the wire band is held next to the sheaf by a griping device formed of two jaws, $o$ and $o^1$, the jaw $o$ being stationary, while the jaw $o^1$ is pivoted to the frame $o^2$, and is operated, at the right time, by the cam O. The pinchers $p$, that cut the wire and retain one end of it fast between them, are located on the opposite side of the twisting-wheel K, and are operated by a series of levers, $p^1$ $p^2$, and link $p^4$, through a cam, P, mounted upon the main shaft J.

To provide against both ends of the wire band entering the same depression in the star-wheel K, I revolve it one-half of a revolution, (after one end has been engaged in one of the depressions,) by means of an arm, N, attached to the main shaft, striking against the periphery of an india-rubber pulley, M, attached to the shaft of the twisting-wheel K.

The revolving rake $b$ is operated by rods $b^2$, pivoted to its shaft B and to the frame E, and it is revolved, while the slatted platform C is free to receive the grain, by means of bent arms $b^3$, attached to its shaft B, striking against a stop, $a^3$, attached to the frame of the machine, and it is held from turning backward by means of a ratchet-wheel, $b^1$, with which the spring-pawl $b^4$ engages.

To regulate the tension upon the binding-wire, and produce a take-up mechanism for the slack wire, I have mounted the reel Q loosely upon a shaft, $q$, passing through bearings in the frame $g$. This shaft $q$ is kept from rotating too freely by a check-spring, $q'$, of india-rubber or other suitable material, pressing against a washer, $r$, resting against the frame $g$, the required pressure being produced by a nut, $r'$, mounted upon the screw-threaded end of the shaft $q$. Upon this shaft $q$ is attached a drum, S, containing a flat coiled spring, $s$. One end of this spring is attached to the drum at $s'$, while the other end is free, and is bent in the form of a loop to receive a pin, $t$, attached to the reel. Thus, when the binding-wire is drawn upon, it first winds up the spring $s$ until it overcomes the tension of the spring $q'$, and the shaft $q$ is permitted to revolve, and unwind the amount of wire required to make a band, and any surplus wire is taken up and wound back upon the reel by the spring $s$ acting upon the pin $t$, attached to the reel.

The tension upon the compressor D' can be regulated by means of washers between its spring and the frame.

To bind grain with this machine, motion is transmitted from the harvester to the main driving-shaft J, the binding-wire having been passed from the reel Q over the guide-pulleys $h$, and through one of the indentations of the star-wheel K, to the pinchers $p$. The reciprocating frame E advances toward the grain-bundle that has been received upon the wire and slatted platform C, where it is compressed by the bent arms D and the spring-compressor D', the arms D being operated by a crank-arm, $d$, and the connecting-rod $d'$ attached to the reciprocating frame E. Then the star-wheel K is turned half a revolution by the arm N striking against the elastic pulley M, and the crescent wire-carrier, continuing to advance and revolve, carries the wire around the bundle of grain, through an indentation of the star-wheel or twister K, to the pinchers, passing it under a hook, $p^3$, upon one of the jaws. Then the pinchers close upon the wire, which is then cut by the sharp edges formed on the fore part of the pinchers, which can also be called "nippers." Then the griping-jaws $o$ $o^1$ close upon the two ends of the wire adjacent to the bundles of grain, and retain them while the twisting-wheel K revolves, and fasten the two ends of the wire by twisting them together. To bring the wire down between the griping-jaws, the wire-carrier $H^1$ is provided with a forked arm, $H^2$, that carries the wire in the desired position to be retained by the griping-jaws. Adjacent to the cutting-edge of the nippers there is a vibrating finger, $p^5$, operated by the lever $p^2$, through the link $p^4$, to lift the end of the wire from the pinchers, so as to have it out of the way when the new wire is brought to the pinchers. After the sheaf has been bound, the main shaft J continuing to revolve, the reciprocating frame E recedes from it, carrying with it the wire-carrier H, and unwinding the wire from the reel, one end of the wire being retained by the pinchers $p$, so as to obtain a length necessary for a band. During this retrocession of the frame E the hook $e'$, located upon said frame, engages with the rod C' attached to the end of the platform C that supports the sheaf, and discharges the latter. The platform C is then returned to its normal position by the balance-weight $c$. During these operations the teeth $b$ of the cut-off have remained in a nearly-vertical position, so as to arrest the grain falling in a continuous stream upon the inclined platform or slide A, although having a sliding motion back and forth upon the guide-rods A', but when the frame E and wire-carrier $H^1$ have receded far enough to clear the platform C, one of the bent arms, $b^3$, striking against the stop $a^3$, partly revolves the cut-off, so as to bring the teeth $b$ under the inclined platform A and allow the grain to slide down upon the binding-wire and slatted platform C, and the above-described operations are repeated.

Having thus fully described my invention, what I claim is—

1. In combination with an inclined slotted platform, A, located under the delivery end of a harvester using aprons or belts to elevate the cut grain, and a reciprocating frame, E, having a wire-carrier, $H^1$, the reciprocating and revolving cut-off operating intermittently, substantially as and for the purposes described.

2. The combination of the twister-pinion, the rubber pulley, and the arm or knocker on the rotating shaft for operating the pinion intermittently, substantially as set forth.

3. In combination with a griping device to hold the wire and nippers to cut it, the twisting-wheel K, constructed with indentations and serrations to receive the wire and hold it while it is twisted, substantially as set forth.

4. The twister-wheel K, provided with indentations and serrations, as described, and adapted to operate substantially as set forth.

5. In combination with a reciprocating frame carrying a hook, $e'$, to engage with an arm, $C'$, attached to a platform for receiving and supporting the grain while it is bound, the pivoted and balanced platform C, operated substantially as described.

6. In combination with a reciprocating frame and a wire-carrier, operated substantially as described, the nippers $p$, having hook $p^3$ upon one jaw, to receive the binding-wire and hold it, substantially in the manner and for the purposes set forth.

7. In combination with platform C, supported by springs $c'$, the vibrating bent arms D and spring-compressor $D'$, operated by reciprocating frame E, substantially as and for the purposes set forth.

In testimony that I claim the foregoing as my own I affix my signature in presence of two witnesses.

JOHN E. BUXTON.

Witnesses:
W. H. SHOEMAKER,
T. L. SLODE.